(12) United States Patent
Vian

(10) Patent No.: US 6,317,658 B1
(45) Date of Patent: Nov. 13, 2001

(54) NEUROCOMPUTING CONTROL DISTRIBUTION SYSTEM

(75) Inventor: John L. Vian, Renton, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/266,514

(22) Filed: Mar. 11, 1999

Related U.S. Application Data

(63) Continuation-in-part of application No. 08/950,966, filed on Oct. 15, 1997.

(51) Int. Cl.[7] ............................................ G05D 1/00
(52) U.S. Cl. .......................... 701/1; 701/59; 706/15; 706/41
(58) Field of Search .................... 701/59, 31, 1; 706/15, 25, 37, 41

(56) References Cited

U.S. PATENT DOCUMENTS

| | | |
|---|---|---|
| 4,721,273 | 1/1988 | Trikha . |
| 4,846,421 | 7/1989 | Trikha . |
| 5,469,530 | 11/1995 | Makram-Ebeid . |
| 5,493,631 | 2/1996 | Huang et al. . |
| 5,583,771 | 12/1996 | Lynch et al. . |
| 5,590,218 | 12/1996 | Ornstein . |
| 5,745,653 | * 4/1998 | Jesion et al. ............................ 395/22 |

OTHER PUBLICATIONS

Vian, J.L. and Visnevski, N.A., "Neural Networks for Nonlinear Control Distribution," Third International Federation of Automatic Control Symposium on Intelligent Components and Instruments for Control Applications, Jun. 9–11, 1997, Annecy, France.

* cited by examiner

*Primary Examiner*—William A. Cuchlinski, Jr.
*Assistant Examiner*—Arthur D. Donnelly
(74) *Attorney, Agent, or Firm*—Christensen O'Connor Johnson Kindness PLLC

(57) ABSTRACT

A method, system and computer-readable medium for controlling a control subsystem of a vehicle. The control subsystem includes at least one propulsion, aerodynamic, or other control effector. The system also includes sensors for sensing vehicle position and motions and operating conditions, a control input device for generating control signals, and a generator for generating desired vehicle forces/moments from the sensed vehicle position and motions and operating conditions, and the generated control input signals based on predefined vehicle compensation and control laws. Also included is a neural network controller for generating control subsystem commands for the at least one propulsion, aerodynamic, or other control effector based on the generated desired forces/moments, wherein said neural network controller was trained based on pregenerated vehicle control distribution data. The neural network controller is also trained to compensate for one or more failed control effectors.

30 Claims, 10 Drawing Sheets

NEUROCOMPUTING CONTROL DISTRIBUTION SYSTEM

CROSS-REFERENCE TO RELATED APPLICATIONS

This application is a continuation-in-part of U.S. patent application Ser. No. 08/950,966, filed Oct. 15, 1997.

FIELD OF THE INVENTION

This invention relates to a method, system and computer-readable medium for performing control in a vehicle and, more particularly, to a method, system and computer-readable medium for accurately determining control subsystem commands in real-time.

BACKGROUND OF THE INVENTION

Propulsion, aerodynamic, and other control subsystems in vehicles, such as vertical takeoff and landing aircraft, satellites, watercraft, and ejection seats, provide forces for controlling the operation of the vehicle. These control subsystems are controlled by controllers that distribute individual control effector commands to the control subsystems. These control distribution commands must provide timely and accurate commands in order for the control subsystems to keep the vehicle operating within predefined limits. For example, the controller in a vertical takeoff and landing aircraft must accurately supply control distribution commands to the propulsion system according to analysis of pilot entered commands, aircraft position and motion, and predetermined limits of the propulsion system, aircraft, and pilot. If the control distribution commands are untimely, jet engine response can lag or misinterpret pilot inputs to the point of causing dangerous vehicle oscillations. If the control distribution commands are inaccurate, jet engine total flow requirements will not be satisfied leading to engine flameout, degraded performance, or catastrophic failure.

Currently, controllers provide control distribution commands using iterative or multiple step algorithms implemented on digital microprocessors. This approach includes linear optimization or pseudo-inverse procedures that are inherently iterative in nature and have varying times of convergence. Iterative algorithms, when used for complex vehicle control, require extensive calculations and thus, have difficulty performing the required computations in real-time. When the iterative and multiple step algorithms cannot be executed in real-time, non-optimal approximate solutions are generated, thereby reducing the accuracy of the control distribution commands.

Another method of generating control distribution commands is a non-iterative linear technique, which uses mode switching when control limits are reached. This results in complex mode switching logic that is impractical to implement and verify. Another method implements multi-dimensional linearly interpolated data tables. This method requires excessive memory to store the data and is unable to execute the linear interpolation algorithms in real-time.

Current methods to design control systems that continue to provide controllability subsequent to control effector failures involve either adding components (redundancy) or reconfiguring the control laws (adaptive control) to rely on the unfailed components. Adding components increases system weight and cost. Adaptive control methods are slow to react to failures.

In summary, the present methods for providing control distribution commands require excessive microprocessor memory and complex mode switching, and are generally insufficient for providing real-time implementation.

The present invention is directed to overcoming the foregoing and other disadvantages. More specifically, the present invention is directed to providing a method, system and computer-readable medium for generating accurate control distribution commands in real-time.

SUMMARY OF THE INVENTION

In accordance with this invention, a neural network controller is trained off-line. The neural network controller is trained for all possible contingencies for the target, or on-line system. The data generated by the off-line, neural network controller is then used in the on-line system, thereby allowing the on-line system to operate in real-time. More specifically, in accordance with this invention, a method, system and computer-readable medium for generating control distribution commands for controlling a control subsystem of a vehicle is provided. The control subsystem includes at least one control effector. The system includes at least one sensor for sensing vehicle position and motion, an optional device for generating operator control signals, and control laws for generating desired vehicle forces/moments. Also included is a neural network controller for generating control effector commands for the at least one control effector based on the generated desired forces/moments, wherein said neural network controller was trained based on pregenerated vehicle control distribution data.

In accordance with other aspects of this invention, the vehicle control distribution data is generated off-line using an algorithm that determines control effector commands based on the desired vehicle forces/moments. The algorithm takes into account control subsystem nonlinearities and constraints, and calculates control effector commands that yield achievable vehicle forces/moments that deviate from the desired vehicle forces/moments in a proportional, prioritized, optimal, or other manner. Actuator limitations, flow balance, aerodynamic nonlinearities, rocket burn time, atmospheric effects, and nozzle area conversions are examples of control subsystem constraints and nonlinearities.

In accordance with still other aspects of this invention, the neural network controller is a unified or a decoupled structure with activation functions. The activation functions are sigmoidal, radial basis or linear functions.

In accordance with further aspects of this invention, the neural network controller is trained off-line using dynamic derivatives and a node decoupled extended Kalman filter technique or a gradient descent technique.

In accordance with yet other aspects of this invention, the neural network controller is implemented as an analog electronic circuit, a computer program, or an application specific integrated circuit.

In accordance with still further aspects of the invention, control effector commands are re-calculated to accommodate a loss of one or more effectors.

As will be readily appreciated from the foregoing summary, the invention provides a new and improved method, system and computer-readable medium for providing control distribution commands to a vehicle's control subsystems. Because command processing time is greatly reduced, excessive time delays in control distribution commands, and dangerous control subsystem and vehicle responses are avoided.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
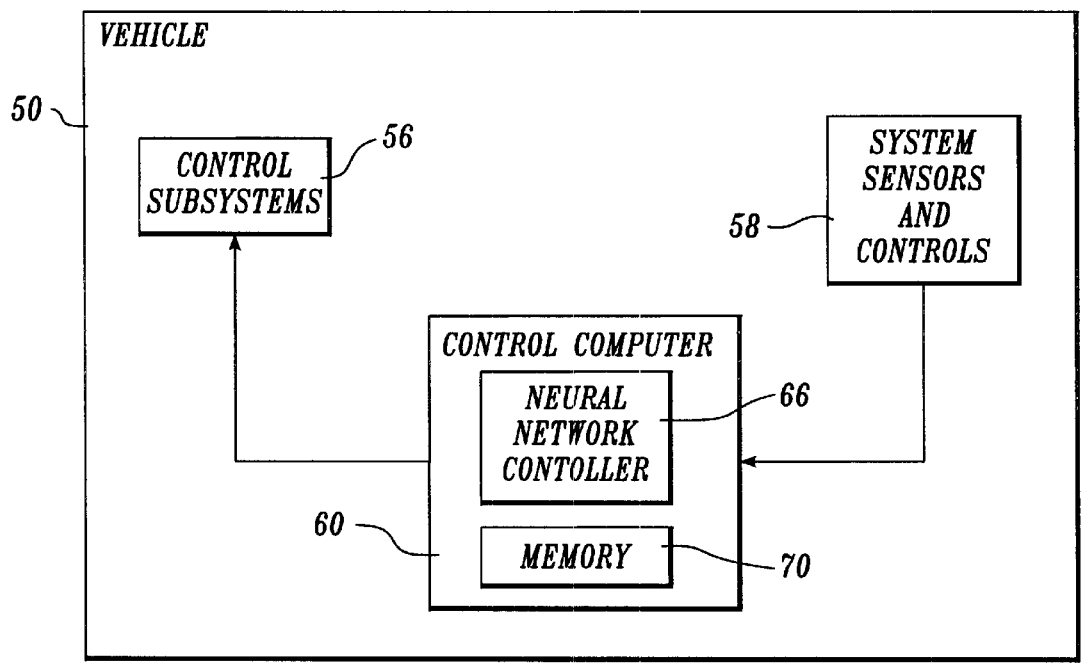
FIG. 1A is a block diagram of a vehicle with a control computer for controlling a control subsystem consisting of a propulsion system according to the present invention.

FIG. 1A illustrates the components of a neurocomputing control distribution system formed in accordance with the present invention. A vehicle 50 includes some type of at least one control subsystem 56, system sensors and controls 58 for sensing control subsystem and vehicle operation and receiving control commands, and a control computer 60 for determining desired vehicle forces/moments and generating control subsystem control distribution signals. Control subsystem 56 includes one or more control effectors for providing aerodynamic, propulsive, or other type of control. Examples of vehicle 50 are an airplane, a helicopter, an ejection seat, a satellite, a watercraft, or other vehicles with control subsystems that require control. The control computer 60 includes a neural network controller 66 and memory 70. Prior to implementation of the neural network controller 66, the neural network controller 66 is trained off-line, using a simulation of the vehicle and its control subsystems to acquire knowledge of actual vehicle control subsystems operation. The type of neural network and training process used is described in more detail below with respect to FIGS. 2–4.

Figure 1B:
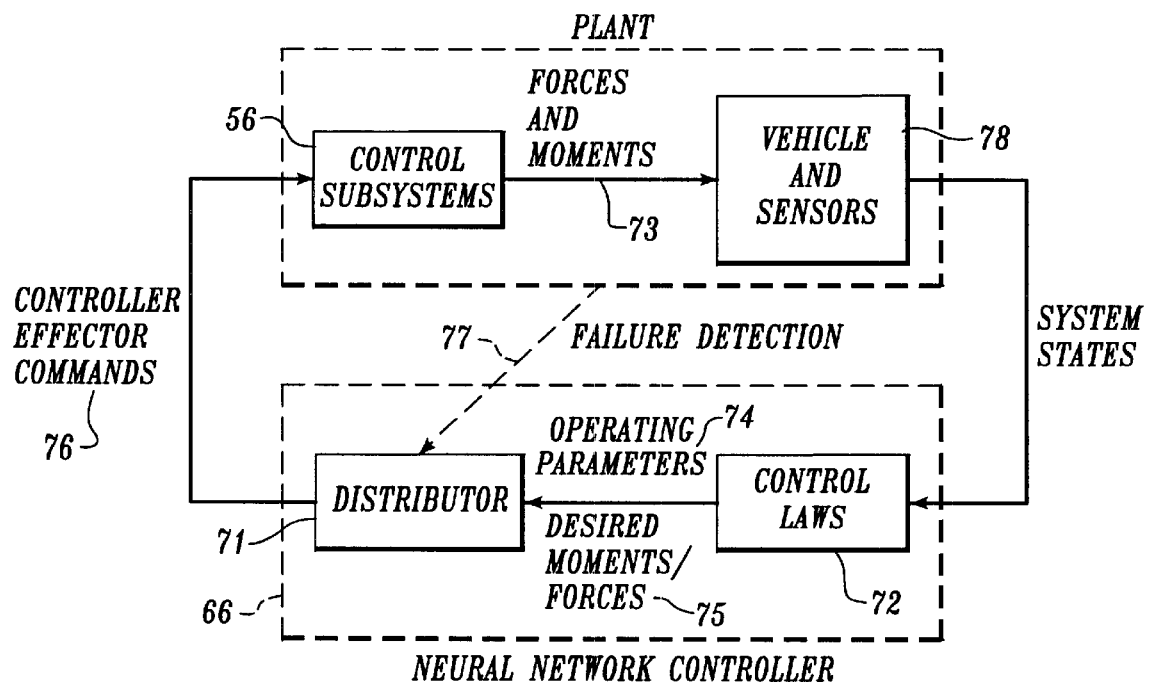
FIG. 1B is a block diagram showing in more detail the interaction among the components shown in FIG. 1A.

FIG. 1B illustrates interaction among the components of a neurocomputing control distribution system, as shown in FIG. 1A. As can be seen in FIG. 1B, the process shown and described herein is a continuous or cyclic process. The vehicle moves based on the forces and moments 73 imparted by the control subsystems 56. The vehicle and control input sensors 78 send system state information to the neural network controller 66. The system states are processed by the control laws function 72 of the neural network controller 66. Based on the control laws, the system states are converted to commands for the moments/forces 75 that are desired to best control the vehicle. The desired moments/forces 75 and other operation parameters 74 such as operating time, temperature, and aerodynamic operating conditions are forwarded to a distributor 71 in the neural network controller 66. The distributor 71 converts the operating parameters 74 and desired forces/moments 75 into control effector commands 76 that are sent to the control subsystems 56. The control subsystems 56 convert the control effector commands to forces and moments 73 that are imparted on the vehicle 78. The process as described above then repeats continuously. If a failure is detected by either the control subsystems 56 or the vehicle sensors and controls 78, a notification of the failure detection 77 is sent to the distributor 71. The distributor takes the failure detection 77 into account in the determination of the control effector commands 76.

Figure 2A:
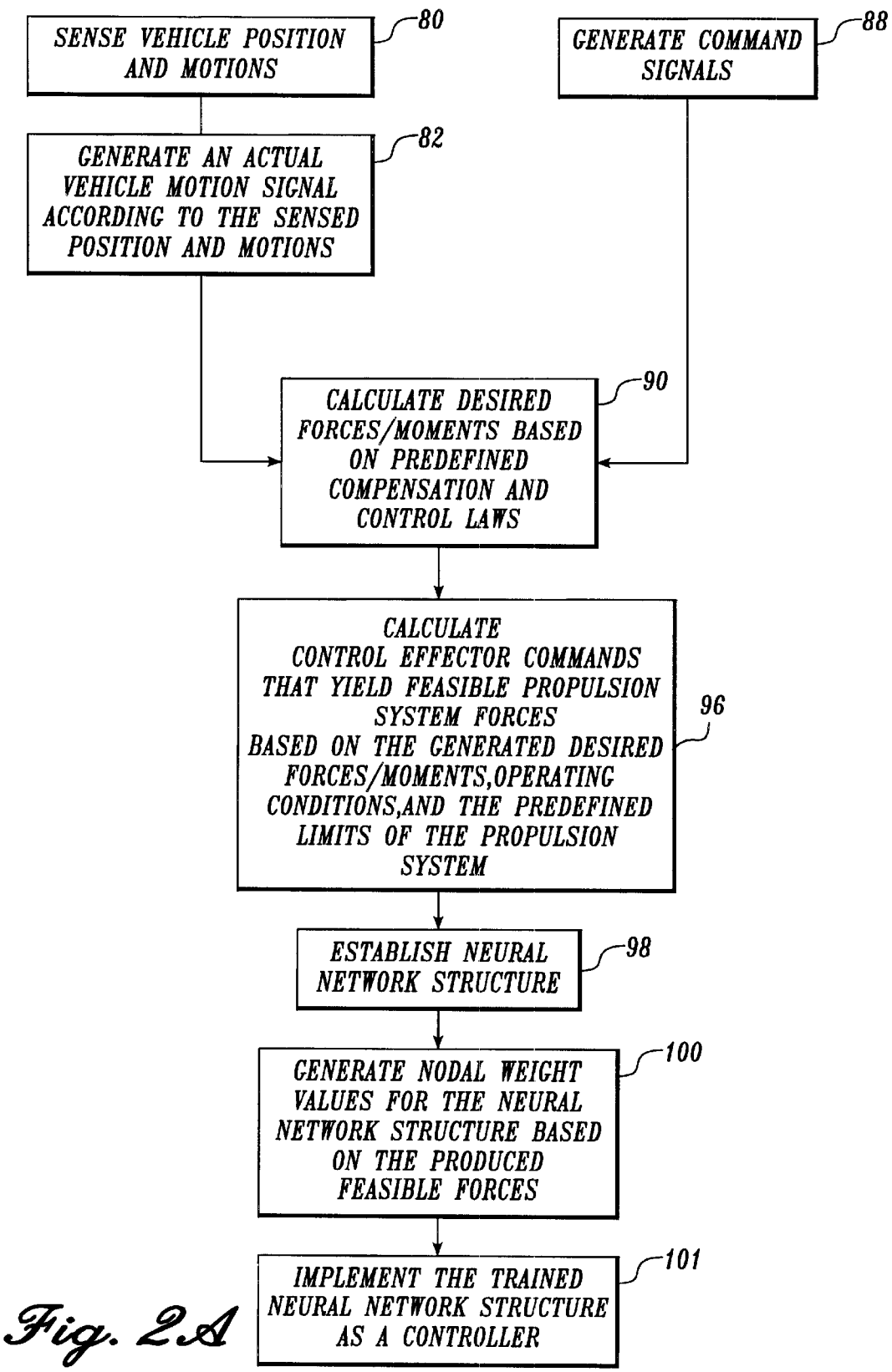
FIG. 2A is a flow diagram illustrating the creation of a neural network controller used in the control computer of the present invention.

FIG. 2A illustrates the neural network controller 66 creation process. First, at block 80, vehicle position and motions are sensed. An actual motion signal is generated based on the sensed vehicle position and motions. See block 82. The types of positions and motions sensed are based on the nature of the vehicle 50. Examples of positions are altitude, aerodynamic incidence angles, roll, pitch and yaw axes positions, and examples of motions are linear and angular velocity, dynamic pressure, and acceleration. At block 88, command signals are generated from either pilot or operator input or from automatic commands. Then, at block 90, desired linear forces and angular moments are calculated based on predefined vehicle compensation and control laws. These calculations are conducted off-line, i.e., they are not conducted in real-time. The off-line calculations are preferably performed on a computer programmed to simulate the vehicle. As can be readily appreciated by those of ordinary skill in the art of propulsion control systems, the predefined compensation and control laws are determined by the nature of the vehicle and the type of vehicle sensors employed.

Next at block 96, control effector commands that yield feasible control subsystem forces/moments are calculated based on the generated desired forces/moments, operating conditions, and the predefined limits of the control subsystems. Again these calculations are conducted off-line. Desired force/moment generation is performed for numerous and extreme possible combinations of vehicle positions and motions. As a result, feasible control subsystem forces/moments are calculated for nearly all possible vehicle positions and motions. An example of one technique for generating control effector commands is a linear iterative search algorithm that iteratively reduces the generated desired forces/moments by a proportionate amount until a reduced force/moment is within the feasible limits of the control subsystem. Other optimization algorithms or techniques, such as deviating in a prioritized order from the desired forces, may be used to determine feasible control subsystem forces/moments. All off-line computations of the control distribution data are performed on a vehicle simulation computer with comparable accuracy to that of the vehicle's control computer. As a result, the off-line computations generate data as it would be in a traditional on-line control computer. Once the process for producing control effector commands that yield feasible control subsystem forces/moments is complete, a neural network is established and trained according to the generated desired forces/moments and control effector commands; the combination of which is the system's control distribution data. Preferably, the calculations anticipate the possibility of the loss of one or more effectors.

While the embodiment of the invention described herein is directed to a vehicle consisting of an ejection seat containing a control subsystem consisting of a rocket propulsion system containing control effectors consisting of moveable nozzles, it will be appreciated that the technique of training a neural network controller off-line can be applied to other types of vehicles, control subsystems, and control effectors. Traditionally, neural network training occurs on-line. A neural network system is able to "learn" by receiving weighted inputs that, with adjustment, time and repetition, can be made to produce appropriate outputs. In the present invention, the training (i.e., learning) of the system occurs off-line, by simulating all possible conditions that can occur on-line. By training the system off-line, the on-line calculations are decreased, thereby decreasing the time required for on-line processing.

Figures 3A, 3B:
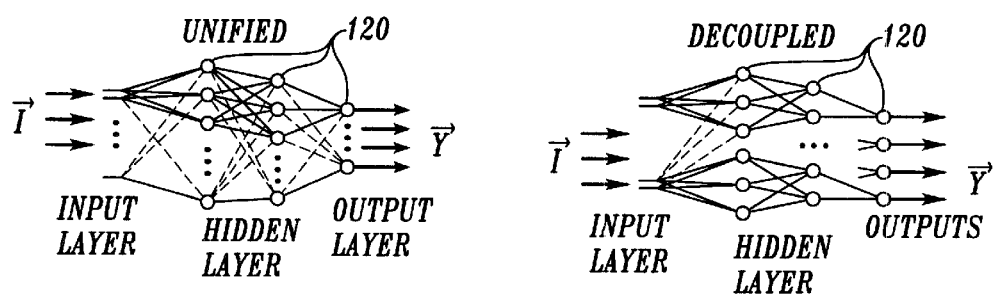
FIGS. 3A and 3B are diagrams illustrating neural model network structures used in the present invention.

Referring to FIG. 2A, at block 98, the neural network structure is established. The neural network structure includes inputs for all the different desired forces/moments 75 and operating parameters 74, and outputs for all the corresponding control effector commands 76 that yield feasible control subsystem forces/moments 73 that are imparted to the vehicle 50. As shown in FIGS. 3A and 3B, the neural network structure used in the present invention can be a unified or decoupled multi-layer perceptron artificial neural network. The neural network structure is selected based on achievable accuracy during training. Next at block 100, the neural network teaching algorithm generates nodal weight values for the established neural network structure based on the generated control distribution data (desired forces/moments and the corresponding control effector commands). Back-propagation algorithms, node decoupled extended Kalman filter methods, or other neural network training techniques can be used to perform this nodal weight value generation. Because these are recursive neural network teaching techniques, the weight values are adjusted for each set of control distribution data. Proper setting of weight values increases the chance that all on-line generated data will be accurate.

Figure 2B:
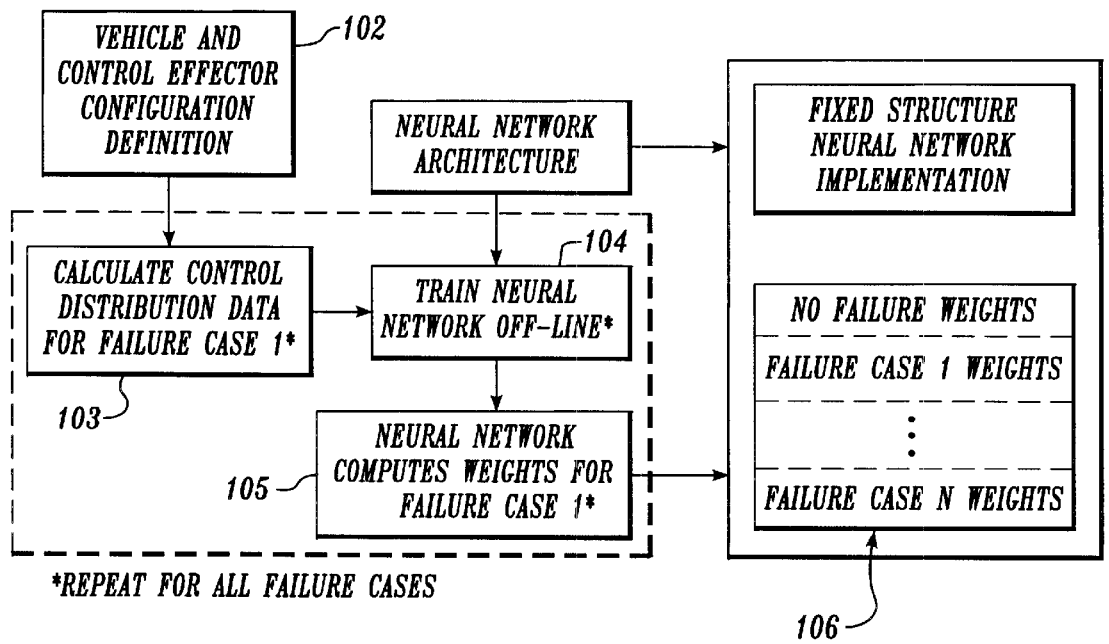
FIG. 2B is a block diagram illustrating implementing failure compensation into the neural network data created by the neural network controller shown in FIG. 2A.

FIG. 2B is a block diagram illustrating the inclusion of all of the possible effector failure cases in the determination of feasible control subsystem forces/moments (blocks 96–100 of FIG. 2A). Control distribution data is calculated for each failure case based on a vehicle and control configuration definition 102. See block 103. The neural network is trained off-line 104. The neural network computes failure weights for each failure case 105. The failure weights are stored 106 for later on-line usage.

Figure 5:
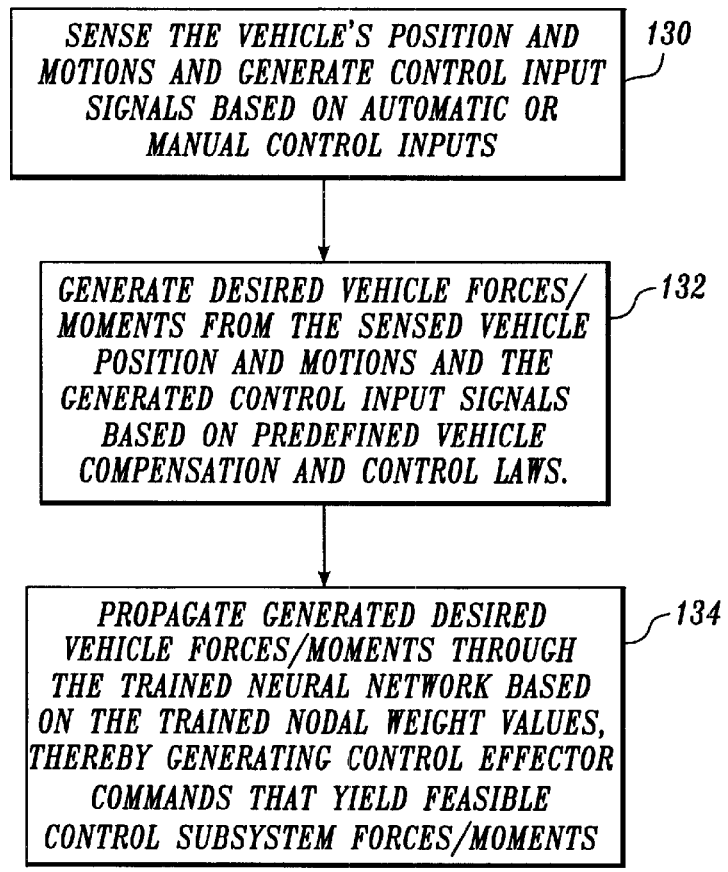
FIG. 5 is a flow diagram illustrating the process of using a trained neural network in accordance with the present invention.

Referring to FIG. 2A, once all the weight values have been generated for the neural network structure, including the effector failure cases, the neural network is implemented as a controller in the control computer 60 of a vehicle 50, as shown in FIG. 1. See block 101. Neural network operation in a vehicle is shown in FIG. 5 and described below. The neural network can be implemented as an analog electric circuit, a computer program, an application specific integrated circuit or any other structure that allows the neural network to function properly.

Returning to FIGS. 3A and 3B, the neural network includes an input layer, one or more hidden layers, and an output layer. The elements that make up each layer of a neural network are referred to as neurons or nodes 120. Inputs are fed forward from the input layer to the hidden layers and then to the output layer. Recursive neural network structures may also have outputs from the layers fed back to preceding layers. The number of neurons 120 in each layer is determined before the network is finally trained. Typically, there is one input node for each input variable and one output node for each output. The input and output layers need not be directly connected (FIG. 3B). In a unified neural network (FIG. 3A), every input node is connected to every node in the following hidden layer and every node in a hidden layer is connected to every node in the following adjacent hidden layer or output layer, depending on the number of hidden layers. Each connection to a particular node is weighted.

Figure 4:
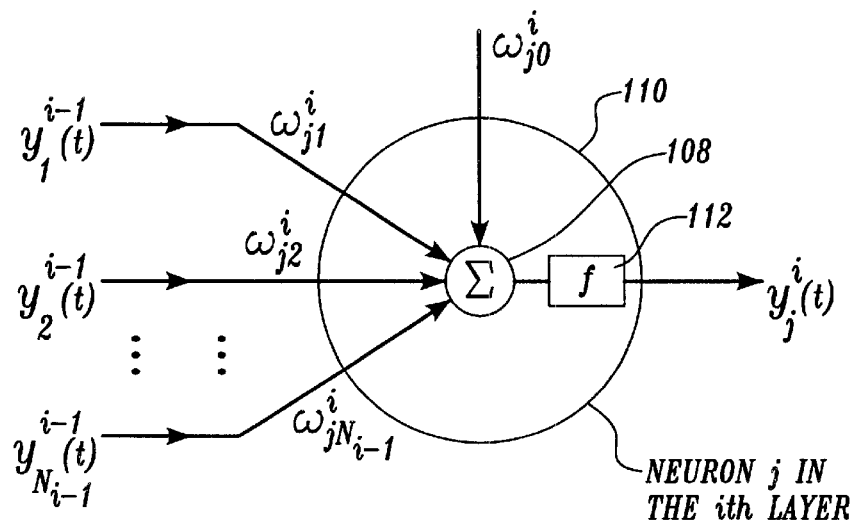
FIG. 4 is a diagram of a single neuron model of the present invention.

The number of nodes in the input and output layers is determined before the network is trained. The number of inputs corresponds to the number of desired forces and moments, and operating parameters. The number of outputs corresponds to the number of control effectors. The number of neurons in the one or more hidden layers is determined during training based on achievable accuracy. FIG. 4 illustrates a single neuron model of a multi-layer perceptron neural network. Equation 1 describes the product of the summation 108 performed within the single neuron model 110 shown in FIG. 4:

$$y\_in_j^i(t) = \omega_{j,0}^i + \sum_{k=1}^{N_{i-1}} \omega_{j,k}^i \cdot y_k^{i-1}(t) \tag{1}$$

where:

j=node number i=neural network layer number (O to L)

k=weight value number t=index to an input pattern $N_i$=the number of neurons in the i-th layer of the network L=the number of layers in the network $\omega_{j,k}^i$=the k-th weight of the j-th neuron in the i-th layer. When k=0, weight value is the bias weight.

$$y_j^i(t) = f(y\_in_j^i(t))$$

is the product of neuron 110 or nodal activation function 112. The nodal activation function 112 is a sigmoidal, radial basis, linear or other function. The nodal activation function sets a value produced by the neuron or activates or deactivates the neuron 110.

Derivatives used in the training process of the invention are based on expressions for dynamic derivatives of recurrent multi-layer perceptrons. The equation used in the training process is written as:

$$\frac{\partial y_j^i(t)}{\partial \omega_{g,h}^l} = f'(y\_in_j^i(t)) \cdot \left\{ (1 - \delta_{l,i}) \cdot \sum_{k=1}^{N_{i-1}} \omega_{j,k+1}^i \cdot \frac{\partial y_k^{i-1}(t)}{\partial \omega_{g,h}^l} + \right. \tag{2}$$

-continued $$\delta_{1,i} \cdot \delta_{g,j} \cdot \left[ \sum_{k=1}^{N_{i-1}} \delta_{h,k+1} \cdot y_k^{i-1}(t) + \delta_{h,1} \right] \right\}, \ 1 \le i$$

where:

$\delta_{ij}$=the Kronecker delta.
If i=j, $\delta_{ij}$=1 and otherwise $\delta_{ij}$=0.

$$f'(y\_in_j^i)$$

is the derivative of the neuron's activation function 112 with respect to $$y\_in_j^i.$$

Traditional back-propagation or other algorithms are used to determine the weight values such that the neural network outputs closely match the control effector commands contained in the control distribution training data. At the beginning of neural network training, the connection weights in the network are set to initial values that may be randomized. Equation 3 describes how weight values can be iteratively adjusted using the dynamic derivatives from equation 2, error values, and a learning rate parameter:

$$\omega\_adjust_{j,k}^i = \omega_{j,k}^i + n \frac{\partial y_j^i}{\partial \omega_{j,k}^i}(y_j^L - y\_desired_j^L) \quad (3)$$

where:

$y_j^L - y\_desired_j^L = $ error $n = $ learning rate parameter.

The training data is then presented to the network one set at a time. In accordance with the present invention, the training data includes various sets of desired forces/moments and the predetermined corresponding control effector commands for a wide range of vehicle operation. The training process continues through all sets of the control distribution training data adjusting the weight values as necessary. Each set, including cases for loss of effectors, provides its own distinct neural network input and output. Accuracy between the discrete values of training data is enhanced by applying random components to the training data as is appreciated by those of ordinary skill in the art of neural network design.

Once the neural network structure has been trained, i.e., all the weight values have been generated for the neural network structure, the neural network structure is implemented as a controller 66 in the control computer 60 of the vehicle 50, as shown in FIG. 1. The neural network structure can be implemented as an analog electric circuit, a computer program, an application specific integrated circuit or any other structure that allows the neural network structure to function properly. FIG. 5 illustrates the process of determining control effector commands with a fully trained neural network structure implemented as the controller 66. At block 130, the vehicle's position and motions are sensed and control input signals are generated according to automatic or manual control inputs. Next at block 132, desired vehicle forces/moments are generated from the sensed vehicle position and motions and the generated control input signals based on predefined vehicle compensation and control laws.

Finally at block 134, the generated desired vehicle forces/moments, and operating parameters are entered into the trained neural network structure. The entered information propagates through the neural network structure getting manipulated according to the trained nodal weight values, thereby generating control effector commands that yield feasible control subsystem forces/moments.

Figure 6:
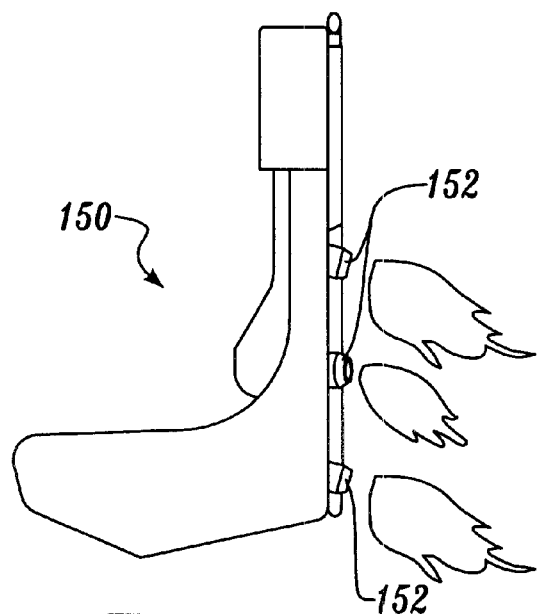
FIG. 6 is a side view of an ejection seat.
Figure 7:
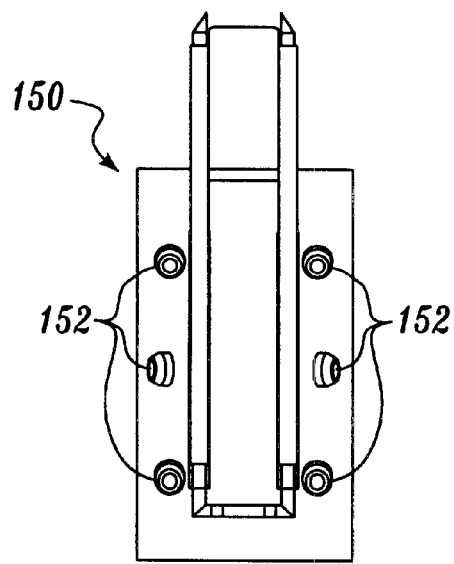
FIG. 7 is a rear view of the ejection seat shown in FIG. 6.
Figure 8:
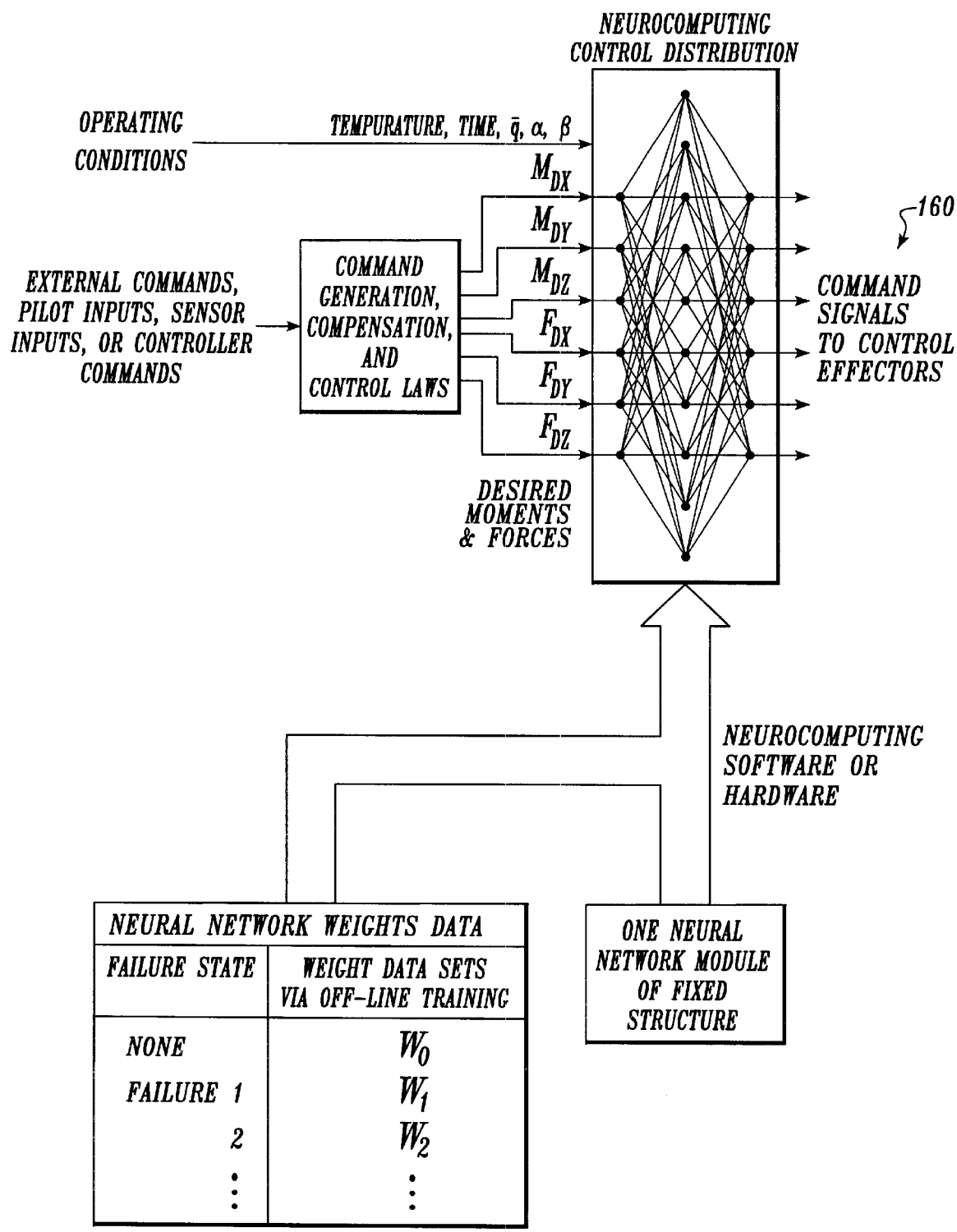
FIG. 8 is a data flow chart of an exemplary embodiment of the present invention suitable for use with an ejection seat of the type shown in FIGS. 6 and 7.

FIGS. 6–8 illustrate the present invention implemented in a vehicle consisting of an ejection seat 150 with a control subsystem consisting of a rocket propulsion system. This example is for illustrative purposes only. FIG. 6 is a side view and FIG. 7 is a rear view of the ejection seat 150 that includes six controllable rocket nozzles 152. Prior to operation of the ejection seat 150, the neural network is selected and trained. As shown in FIG. 8, the inputs to the neural network are the sets of ejection seat desired moments $M_{DX}$, $M_{DY}$, $M_{DZ}$ and desired forces $F_{DX}$, $F_{DY}$, $F_{DZ}$. The range of desired forces/moments is determined via off-line simulation using ejection seat six degree of freedom models, operating environment models, and knowledge of the operational envelope. The sets of desired forces/moments are then calculated as evenly spaced values within the range. The neural network output training data are the corresponding sets of rocket nozzle thrust commands 160 for each rocket nozzle 152. The sets of best feasible rocket nozzle control data 160 are calculated off-line using engineering analysis software that simulates the ejection seat 150 and linear iterative numerical methods or other optimization algorithms. The best feasible rocket nozzle control data is produced based on seat kinematics, ejection seat capabilities and maximum propulsion system and individual nozzle thrust capabilities. Other ejection seat limitations may further define best feasible rocket nozzle forces. Each set of feasible rocket nozzle control data corresponds to a set of desired moments and forces. Each set of feasible rocket nozzle control data includes an output that is supplied to a corresponding rocket nozzle.

Propulsion system control distribution input data (desired vehicle forces/moments) are calculated for numerous ejection seat linear and angular attitudes, rates and accelerations that include maximum values to provide data for the entire operating range for complete neural network training. Prior to actual ejection seat operation, the angular attitudes and rates and accelerations of the ejection seat 150 are the same as those experienced by the aircraft, because the ejection seat 150 is fixed within the aircraft. The neural network is then trained off-line using the calculated control distribution input and output data that covers the entire range of seat operation.

The trained neural network structure is implemented in the ejection seat's control computer. The neural network structure can be implemented as software, application specific integrated circuits, or analog electronic hardware. Once the neural network structure has been implemented, the ejection seat is ready for on-line operation.

During on-line operation, desired forces/moments are continually being generated. The neural network determines rocket nozzle thrust commands based on the generated desired forces/moments. The desired force/moment data propagates through the trained neural network structure based on the type of network and the determined weight values to produce rocket nozzle thrust commands for each rocket nozzle actuator. The rocket nozzle actuators respond to the commands to produce thrust at each nozzle that maintains operation within the propulsion system constraints, when the ejection seat has been activated. Thus, the propulsion subsystem produces feasible forces/moments that deviate from the desired forces/moments in the previously prescribed manner in order to remain within the operating limits of the subsystem. It can be appreciated that the control effector command in this example, thrust command, could be put in terms of actuator position.

Figure 9A:
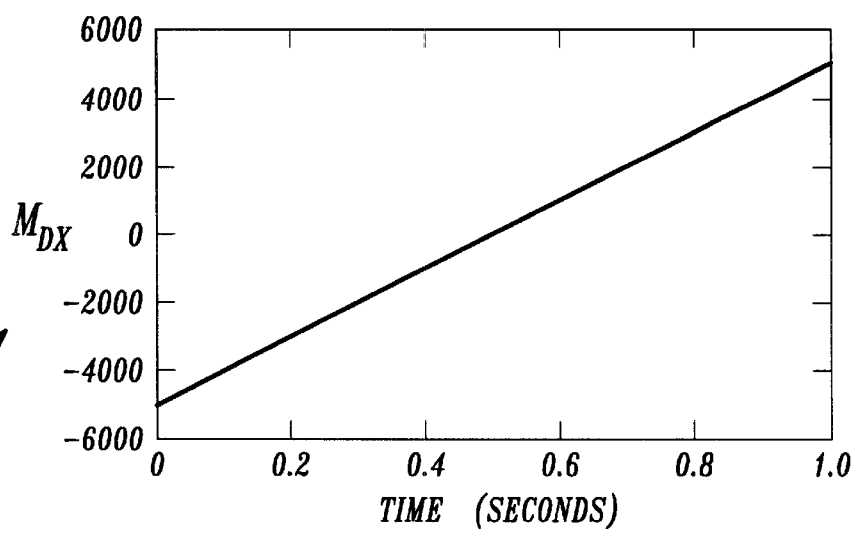
FIG. 9 is a graph of three varying inputs into a control computer formed in accordance with the present invention and formed in accordance with a previously known method.
Figure 9B:
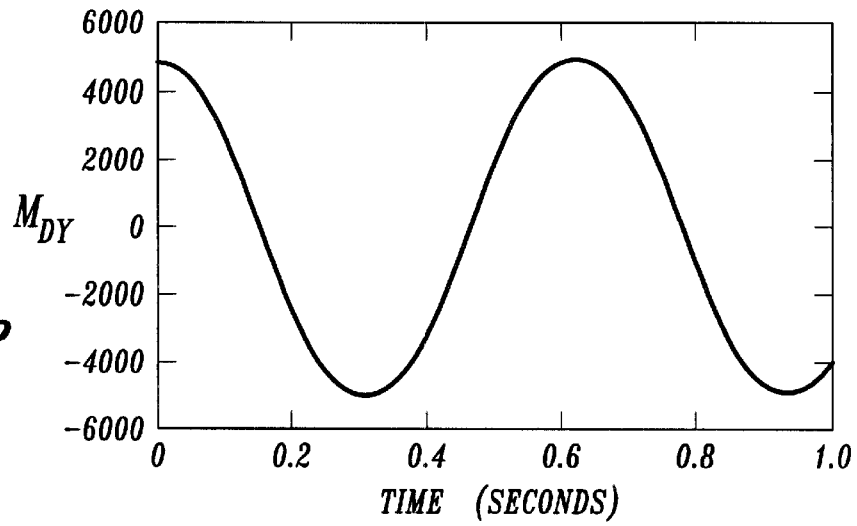
Figure 9C:
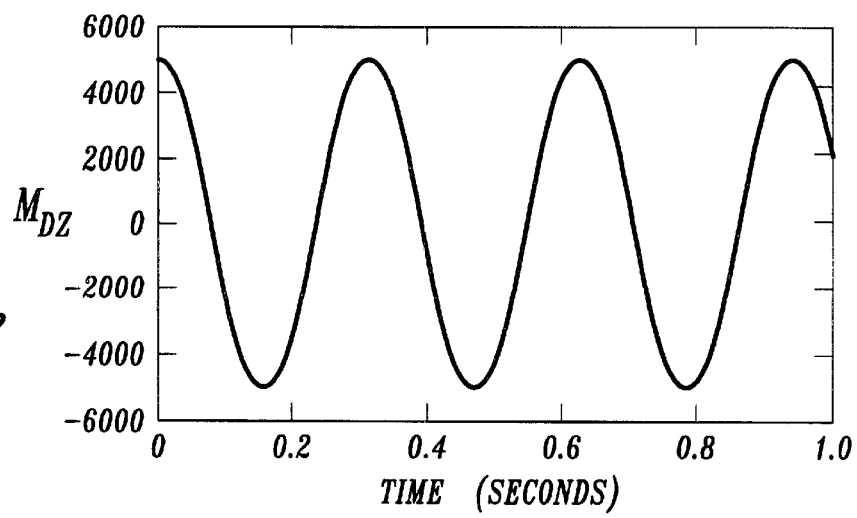
Figure 10:
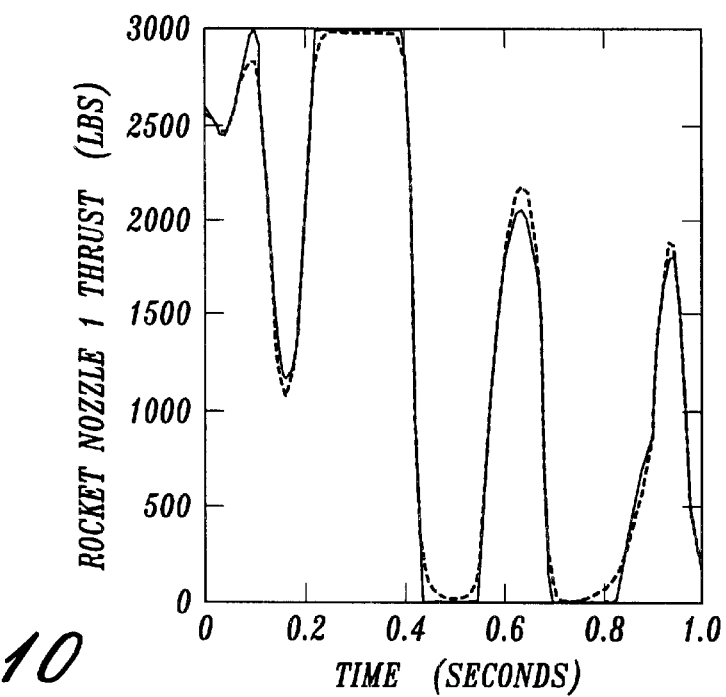
FIGS. 10 and 11 are graphs comparing a control computer formed in accordance with the present invention and formed in accordance with a previously known method simulated in the ejection seat shown in FIGS. 6 and 7.
Figure 11:
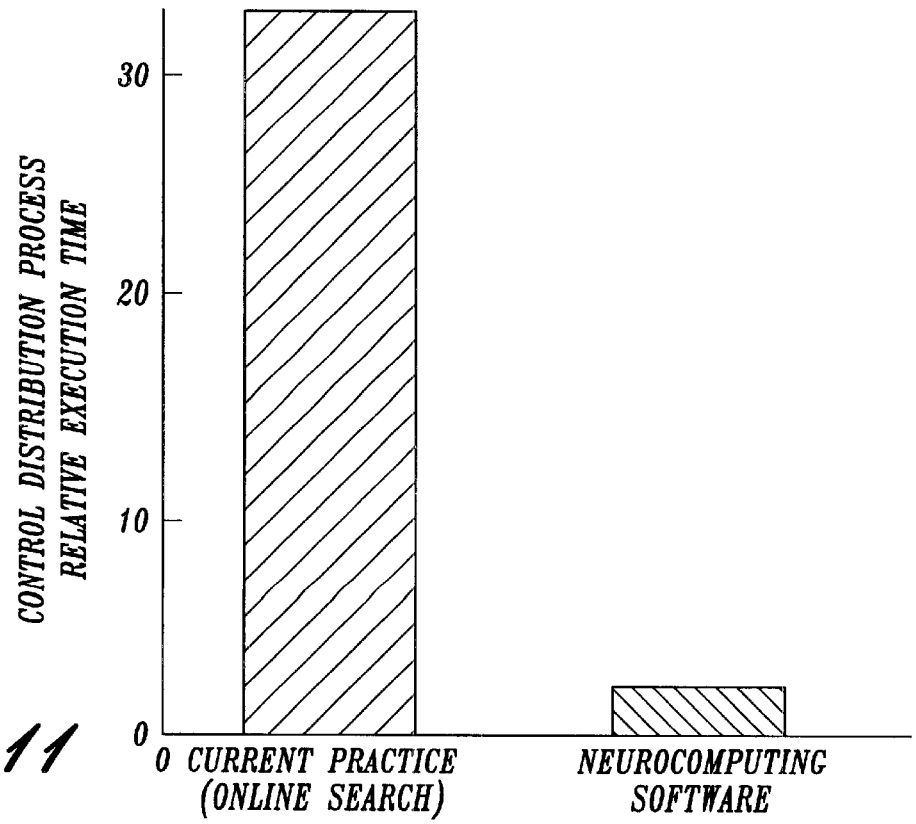

FIG. 9 illustrates time varying input values to a control computer of a vehicle. The time varying input values are three desired forces/moments (moments $M_{DX}$, $M_{DY}$ and $M_{DZ}$). FIGS. 10 and 11 illustrate a comparison of results of two control computers of the ejection seat shown in FIGS. 6–8 with the input values shown in FIG. 9. One of the two control computers includes the previously known method of on-line searching and the other of the two control computers includes the present invention of a trained neural network to generate nozzle thrust commands that yield feasible propulsion system forces/moments. In this example, only desired moments were used for the comparison. In order to provide a proper comparison between the two control computers, each of the moments has been chosen to vary differently in time (0–1 sec) between preset desired moment values (–5,000 to +5,000) as shown in FIG. 9. As a result, a wide range of ejection seat desired motion values are used in the comparison.

FIG. 10 illustrates the thrust of rocket nozzle 1 in pounds of thrust as determined by the two control computers over the same time period given the input moment values shown in FIG. 9. The on-line searching control computer method is illustrated by the solid line and the neural network control computer is illustrated by the dotted line. It is noted that the neural network control computer maps nearly identical to that of the on-line search control computer. The difference in the output of the control computer for each of these techniques is virtually identical and thus, processing accuracy is maintained.

However, as shown in FIG. 11, the processing time of the on-line search control computer is significantly slower than the neural network control computer. An engineering work station accurately simulated the processing of each control computer with the input being the moment graphs shown in FIG. 9. The engineering work station determined that the on-line search control computer took approximately 0.33 CPU seconds to determine rocket nozzle thrust data and the neural network control computer took approximately 0.01 CPU seconds to perform the same task. This decrease in processing speed of 30 times or greater significantly reduces the risk that can occur when processing lags the requirements of the dynamically moving vehicle.

Figure 12:
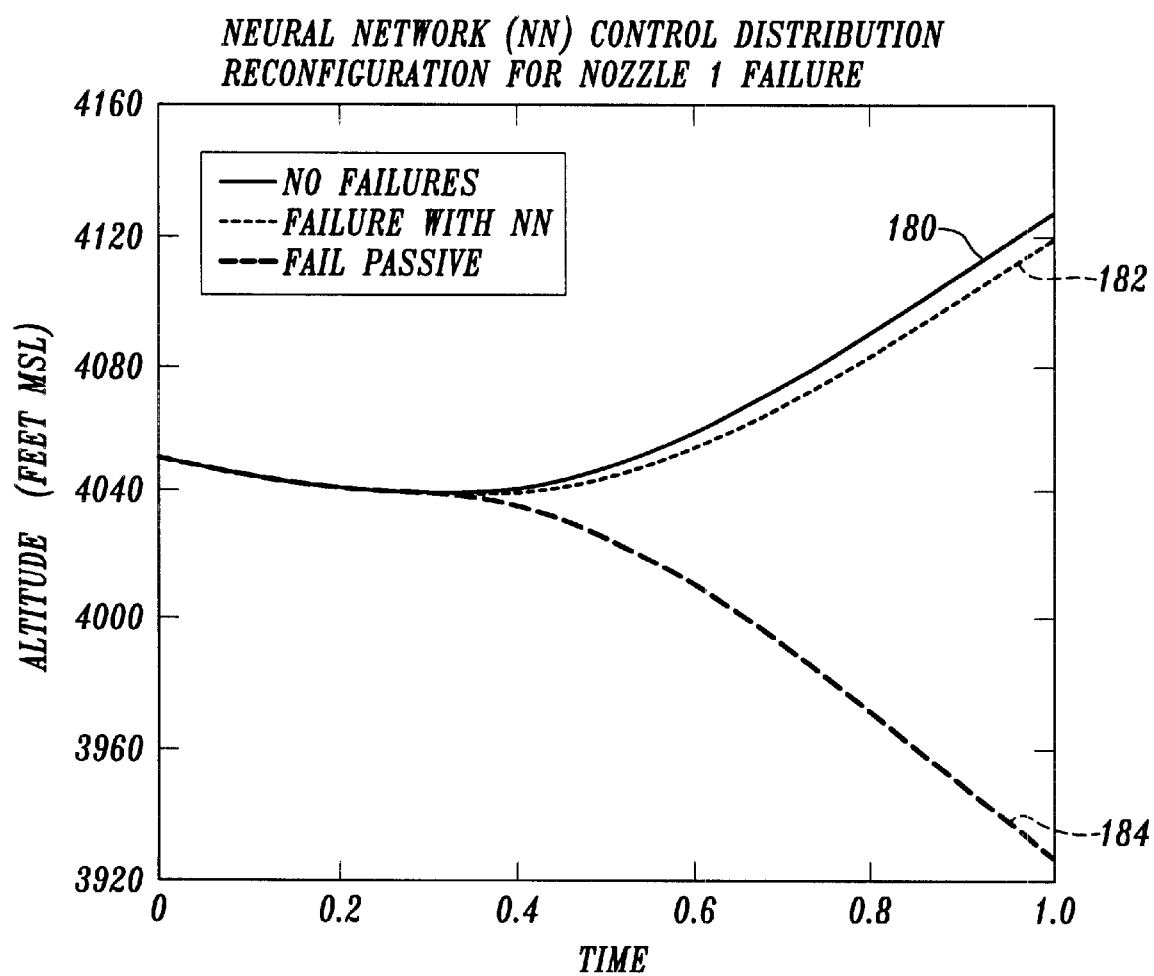
FIGS. 12–14 are graphs comparing ejection seat performance using a propulsion system without control effector failures, a propulsion system with control effector failures, but no failure compensation, and a propulsion system with control effector failures and with failure compensation.

FIG. 12 illustrates comparisons of the altitude gained by an ejection seat for the cases of: a system without any failed effectors (solid line) 180; a system with one failed effector, with failure compensation (dotted line) 182; and a system with the same failed effector, but no failure compensation (dashed line) 184. It is noted that the ejection seat altitude of the system with a failed effector with failure compensation maps nearly identical to the system without any failed effectors, whereas, the system with a failed effector without failure compensation shows substantial loss of altitude.

Figure 13:
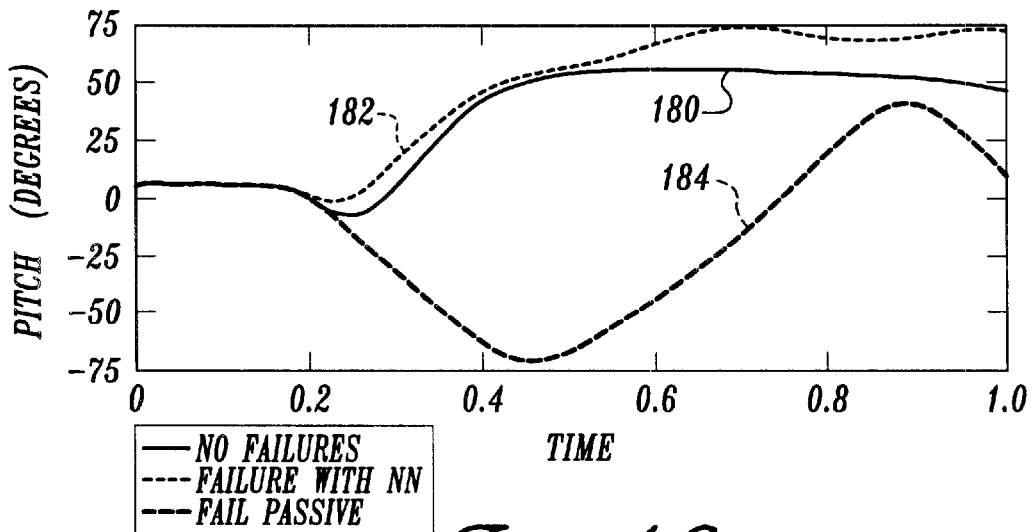
Figure 14:
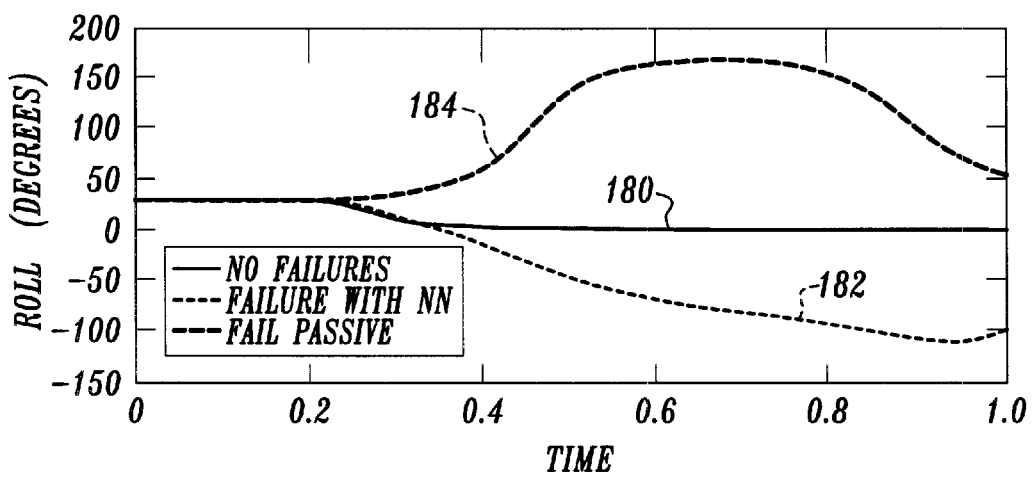

Similarly, ejection seat pitch and roll for a system with a failed effector with failure compensation 182 maps much more closely to a system with no failed effectors 180 than does a system with a failed effector, but no failure compensation 184. See FIGS. 13 and 14.

In summary, the neural network control computer generates similarly accurate propulsion control data at a fraction of the speed of prior techniques. Because command processing time is greatly reduced, time delays in processing control commands and dangerous, lagging propulsion system responses are avoided.

While the preferred embodiment of the invention has been illustrated and described, it will be appreciated that various changes can be made therein without departing from the spirit and scope of the invention.

What is claimed is:

1. A control system for controlling the movement of a thrust-propelled vehicle, comprising:

(a) a neural network controller, wherein said neural network controller is trained off-line in order to generate nodal weight values for a plurality of system conditions for a thrust-propelled vehicle, including the velocity of movement of the thrust-propelled vehicle in at least one direction;

(b) means for sensing the velocity of movement of the thrust-propelled vehicle in the at least one direction; and (c) means for generating at least one command based on the sensed velocity of movement of the thrust-propelled vehicle in the at least one direction and the nodal weight values contained in the neural network controller for the velocity of movement of the thrust-propelled vehicle in the at least one direction.

2. A control system for controlling a vehicle, said vehicle containing a control subsystem including at least one propulsion, aerodynamic, or other control effector, said control system comprising:

(a) at least one sensor for sensing vehicle position and motions and operating conditions;

(b) control means for generating control input signals;

(c) a generator for generating desired vehicle forces/moments from the sensed vehicle position and motions and the generated control input signals based on predefined vehicle compensation and control laws; and (d) a neural network controller for generating commands for the at least one control effector by propagating the generated desired vehicle forces/moments, and operating conditions, through the neural network controller.

3. The control system of claim 2, wherein the at least one control effector comprises at least one operational effector.

4. The control system of claim 3, wherein the at least one control effector comprises at least one failed effector.

5. A method for controlling the movement of a thrust-propelled vehicle, comprising:

(a) training a neural network controller off-line, said training comprising:
      (i) generating a plurality of possible system commands based on possible conditions of a thrust-propelled vehicle;
      (ii) establishing a neural network structure; and
      (iii) generating nodal weight values for the established neural network structure for each of the possible system commands;

(b) sensing a condition of the thrust-propelled vehicle; and (c) the neural network controller generating at least one system command based on the sensed condition of the thrust-propelled vehicle and the nodal weight value generated off-line for the condition of the thrust-propelled vehicle.

6. A computer-readable medium having computer-executable instructions for performing a method for controlling the movement of a thrust-controlled vehicle, comprising:

(a) training a neural network controller off-line, said training comprising:

(i) generating a plurality of possible system commands based on possible conditions of a thrust-propelled vehicle;
(ii) establishing a neural network structure; and
(iii) generating nodal weight values for the neural network controller for each of the possible system commands;

(b) sensing a condition of the thrust-propelled vehicle; and (c) the neural network controller generating at least one system command based on the sensed condition of the thrust-controlled vehicle and the nodal weight value generated off-line for the system command.

7. A method for controlling a vehicle, said vehicle containing a control subsystem including at least one propulsion, aerodynamic, or other control effector, said method comprising:

(a) sensing vehicle position and motions and operating conditions;

(b) generating control signals based on control inputs;

(c) generating desired vehicle forces/moments from the sensed vehicle position and motions and the generated control input signals based on predefined vehicle compensation and control laws; and (d) generating commands for the at least one control effector by propagating the generated desired vehicle forces/moments and operating conditions through a neural network.

8. The method of claim 7, wherein the at least one control effector comprises at least one operational effector.

9. The method of claim 8, wherein the at least one control effector comprises at least one failed effector.

10. A computer-readable medium having computer-executable instructions for performing the method comprising:

(a) sensing vehicle position and motions and operating conditions;

(b) generating control signals based on control inputs;

(c) generating desired vehicle forces/moments from the sensed vehicle position and motions and the generated control input signals based on predefined vehicle compensation and control laws; and (d) generating commands for the at least one control effector by propagating the generated desired vehicle forces/moments and operating conditions through a neural network.

11. A method for training a neural network to control a control subsystem of a vehicle, said control subsystem including at least one propulsion, aerodynamic, or other control effector, said method comprising:

(a) generating sets of desired vehicle forces/moments for possible vehicle command input signals, and vehicle position and motions based on predefined vehicle compensation and control laws;

(b) generating sets of control effector commands that yield feasible control subsystem forces/moments that correspond to sets of generated desired vehicle forces/moments;

(c) establishing a neural network structure; and (d) generating nodal weight values for the established neural network structure based on the generated sets of generated desired vehicle forces/moments and the corresponding sets of control effector commands that yield feasible control subsystem forces/moments.

12. The method of claim 11, wherein the at least one control effector comprises at least one operational effector.

13. The method of claim 12, wherein the at least one control effector comprises at least one failed effector.

14. The method of claim 11, wherein said generated sets of control effector commands that yield feasible control subsystem forces/moments includes at least one control effector comprising a controllable rocket nozzle.

15. The method of claim 11, wherein said generating sets of control effector commands is based on a linear iterative search algorithm and control subsystem limitations.

16. The method of claim 15, wherein the linear iterative search algorithm proportionally deviates desired forces/moments to generate control effector commands.

17. The method of claim 15, wherein the linear iterative search algorithm deviates in a prioritized order from the desired forces/moments.

18. The method of claim 11, wherein the established neural network structure is a unified structure.

19. The method of claim 11, wherein the established neural network structure is a decoupled structure.

20. The method of claim 11, wherein the neural network structure comprises neurons with activation functions.

21. The method of claim 20, wherein the activation functions are sigmoidal functions.

22. The method of claim 20, wherein the activation functions are radial basis functions.

23. The method of claim 20, wherein the activation functions are linear functions.

24. The method of claim 1, wherein generating nodal weight values for the established neural network structure further comprises generating nodal weight values based on dynamic derivatives and a node decoupled extended Kalman filter technique.

25. The method of claim 11, wherein generating nodal weight values for the established neural network structure further comprises generating nodal weight values based on a gradient descent technique.

26. The method of claim 11, wherein the neural network structure is implemented as an analog electronic circuit.

27. The method of claim 11, wherein the neural network structure is implemented as an application specific integrated circuit.

28. The method of claim 11, wherein said generating sets of control effector commands that yield feasible control subsystem forces/moments is based on an optimization algorithm with an objective function and control subsystem limitations.

29. The method of claim 11, wherein said generating sets of control effector commands that yield feasible control subsystem forces/moments is based on a multiple step reduction algorithm with control subsystem limitations.

30. A computer-readable medium having computer-executable instructions for performing the method comprising:

(a) generating sets of desired vehicle forces/moments for possible vehicle command input signals, and vehicle position and motions based on predefined vehicle compensation and control laws;

(b) generating sets of control effector commands that yield feasible control subsystem forces/moments that correspond to sets of generated desired vehicle forces/moments;

(c) establishing a neural network structure; and (d) generating nodal weight values for the established neural network structure based on the generated sets of generated desired vehicle forces/moments and the corresponding sets of control effector commands that yield feasible control subsystem forces/moments.

* * * * *

UNITED STATES PATENT AND TRADEMARK OFFICE
CERTIFICATE OF CORRECTION

PATENT NO. : 6,317,658 B1
DATED : November 13, 2001
INVENTOR(S) : J.L. Vian

It is certified that error appears in the above-identified patent and that said Letters Patent is hereby corrected as shown below:

Column 12,
Line 5, "includes" should read -- include --
Line 27, "claim 1," should read -- claim 11, --

Signed and Sealed this

Twenty-seventh Day of August, 2002

Attest:

JAMES E. ROGAN
Attesting Officer  Director of the United States Patent and Trademark Office